(12) United States Patent
Hoover et al.

(10) Patent No.: US 7,913,010 B2
(45) Date of Patent: Mar. 22, 2011

(54) NETWORK ON CHIP WITH A LOW LATENCY, HIGH BANDWIDTH APPLICATION MESSAGING INTERCONNECT

(75) Inventors: Russell D. Hoover, Rochester, MN (US); Jon K. Kriegel, Rochester, MN (US); Eric O. Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 12/031,733

(22) Filed: Feb. 15, 2008

(65) Prior Publication Data

US 2009/0210592 A1    Aug. 20, 2009

(51) Int. Cl.
G06F 13/00 (2006.01)
G06F 13/28 (2006.01)
H04L 12/43 (2006.01)

(52) U.S. Cl. ......... 710/107; 710/22; 711/122; 370/458
(58) Field of Classification Search .......... 710/107, 710/22; 711/122; 370/458
See application file for complete search history.

(56) References Cited

U.S. PATENT DOCUMENTS

| | | | |
|---|---|---|---|
| 4,813,037 A | 3/1989 | Debuysscher et al. | |
| 5,761,516 A | 6/1998 | Rostoker et al. | |
| 5,884,060 A | 3/1999 | Vegesna et al. | |
| 6,085,315 A | 7/2000 | Fleck et al. | |
| 6,145,072 A | 11/2000 | Shams et al. | |
| 6,151,668 A | 11/2000 | Pechanek et al. | |
| 6,567,895 B2 | 5/2003 | Scales | |
| 6,668,308 B2 | 12/2003 | Barroso et al. | |
| 6,675,284 B1 * | 1/2004 | Warren ............... | 712/38 |
| 6,725,317 B1 | 4/2004 | Bouchier et al. | |
| 6,950,438 B1 | 9/2005 | Owen et al. | |
| 7,162,560 B2 | 1/2007 | Taylor et al. | |
| 7,394,288 B1 | 7/2008 | Agarwal | |
| 7,398,374 B2 | 7/2008 | DeLano | |
| 7,464,197 B2 * | 12/2008 | Ganapathy et al. .... | 710/22 |
| 7,493,474 B1 | 2/2009 | Pechanek et al. | |
| 7,500,060 B1 * | 3/2009 | Anderson et al. ..... | 711/132 |
| 7,502,378 B2 * | 3/2009 | Lajolo et al. ......... | 370/413 |
| 7,521,961 B1 * | 4/2009 | Anderson ............. | 326/41 |
| 7,546,444 B1 * | 6/2009 | Wolrich et al. ....... | 712/228 |
| 7,568,064 B2 | 7/2009 | Reblewski et al. | |
| 2002/0178337 A1 | 11/2002 | Wilson et al. | |
| 2003/0065890 A1 | 4/2003 | Lyon | |

(Continued)

OTHER PUBLICATIONS

Jeffrey Kuskin et al , The Stanford Flash Multiprocessor, Jun. 6, 1996, Stanford University.*

(Continued)

Primary Examiner — Mark Rinehart
Assistant Examiner — Christopher A Daley
(74) Attorney, Agent, or Firm — Biggers & Ohanian, LLP

(57) ABSTRACT

A network on chip ('NOC') and methods of data processing on the NOC, the NOC including integrated processor ('IP') blocks, a data communications bus (110), memory communications controllers (106), and bus interface controllers (108); each IP block adapted to the data communications bus through a memory communications controller and a bus interface controller; each memory communications controller, in conjunction with one of the bus interface controllers, controlling memory addressed communications between an IP block and memory; each memory communications controller, in conjunction with one of the bus interface controllers, controlling memory addressed communications between one of the IP blocks and other IP blocks; each IP block adapted to the data communications bus by a low latency, high bandwidth application messaging interconnect comprising an inbox and an outbox.

16 Claims, 6 Drawing Sheets

U.S. PATENT DOCUMENTS

| | | | |
|---|---|---|---|
| 2004/0088487 A1* | 5/2004 | Barroso et al. | 711/122 |
| 2004/0260906 A1 | 12/2004 | Landin et al. | |
| 2005/0166205 A1 | 7/2005 | Oskin et al. | |
| 2005/0238035 A1* | 10/2005 | Riley | 370/401 |
| 2006/0209846 A1 | 9/2006 | Clermidy et al. | |
| 2007/0055826 A1 | 3/2007 | Morton et al. | |
| 2007/0076739 A1 | 4/2007 | Manjeshwar et al. | |
| 2008/0134191 A1 | 6/2008 | Warrier et al. | |
| 2008/0186998 A1* | 8/2008 | Rijpkema | 370/458 |
| 2008/0205432 A1* | 8/2008 | Gangwal | 370/458 |
| 2009/0083263 A1 | 3/2009 | Felch et al. | |
| 2009/0282222 A1 | 11/2009 | Hoover et al. | |

OTHER PUBLICATIONS

Isask'har Walter, Israel Cidon and Avinoam Kolodny BENoC: A bus-Enhanced Network on-Chip, Dec. 2007, Technion-Israel Institute of Technology, Haifa, Israel.*

Seppo Virtanen, Jani paakkulainen, Tero Nurmi, Jouni Isoaho, NoC Interface for a Protocol, University of Turku.*

Steve Furber, Future Trends in SOC Interconnect, Aug. 2000.*

U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Office Action Dated Jan. 29, 2010 in U.S. Appl. No. 11/945,396.
Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.

* cited by examiner ated computer useless.

NETWORK ON CHIP WITH A LOW LATENCY, HIGH BANDWIDTH APPLICATION MESSAGING INTERCONNECT

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

A network on chip ('NOC') and methods of data processing on the NOC, the NOC including integrated processor ('IP') blocks, a data communications bus (110), memory communications controllers (106), and bus interface controllers (108); each IP block adapted to the data communications bus through a memory communications controller and a bus interface controller; each memory communications controller, in conjunction with one of the bus interface controllers, controlling memory addressed communications between an IP block and memory; each memory communications controller, in conjunction with one of the bus interface controllers, controlling memory addressed communications between one of the IP blocks and other IP blocks; each IP block adapted to the data communications bus by a low latency, high bandwidth application messaging interconnect comprising an inbox and an outbox.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
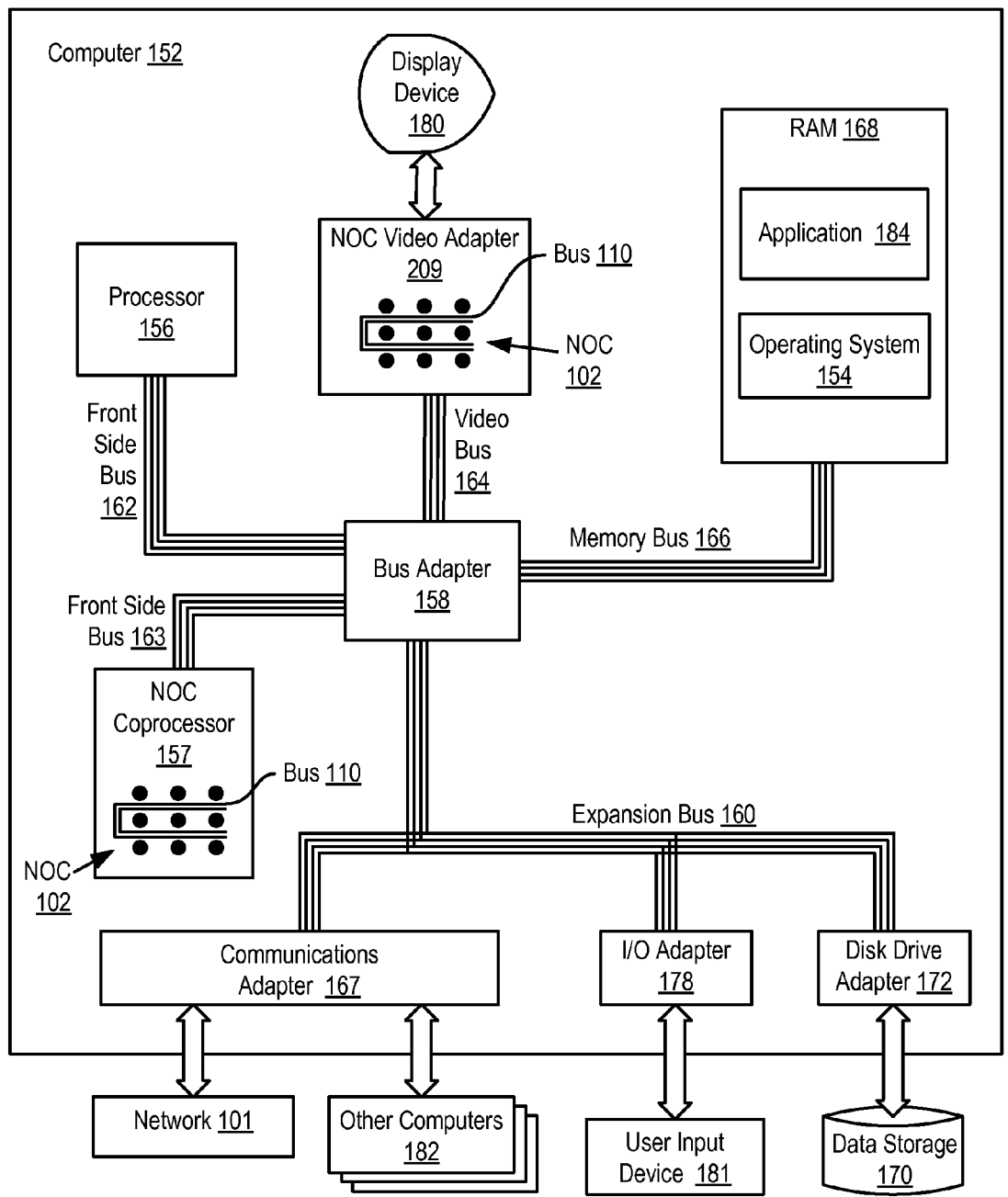
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs (102) according to embodiments of the present invention: a video adapter (209) and a coprocessor (157). The NOC video adapter (209) is an example of an I/O adapter specially designed for graphic output to a display device (180) such as a display screen or computer monitor. The NOC video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor (157) of FIG. 1 is optimized to accelerate particular data processing tasks at the behest of the main processor (156).

The example NOC video adapter (209) and NOC coprocessor (157) of FIG. 1 each include a NOC (102) according to embodiments of the present invention, including integrated processor ('IP') blocks, a data communications bus (110), memory communications controllers, and bus interface controllers. Each IP block is adapted to a data communications bus through a memory communications controller and a bus interface controller. Each memory communications controller, in conjunction with one of the bus interface controllers, controls memory addressed communications between an IP block and memory. Each memory communications controller, in conjunction with one of the bus interface controllers, also controls memory addressed communications between one of the IP blocks and other IP blocks. Each IP block is also adapted to the data communications bus (110) by a low latency, high bandwidth application messaging interconnect comprising an inbox and an outbox. The NOC video adapter (209) and the NOC coprocessor (157) are optimized for programs that use parallel processing and also require fast random access to shared memory. The details of the NOC structure and operation are discussed below with reference to FIGS. 2-6.

The computer (152) of FIG. 1 includes a disk drive adapter (172) coupled through expansion bus (160) and bus adapter (158) to processor (156) and other components of the computer (152). The disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (101). Such data communications may be carried out serially through RS-232 connections, through external buses such as a Universal Serial Bus ('USB'), through data communications data communications networks such as Internet Protocol ('IP') data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired network communications, and 802.11 adapters for wireless network communications.

Figure 2:
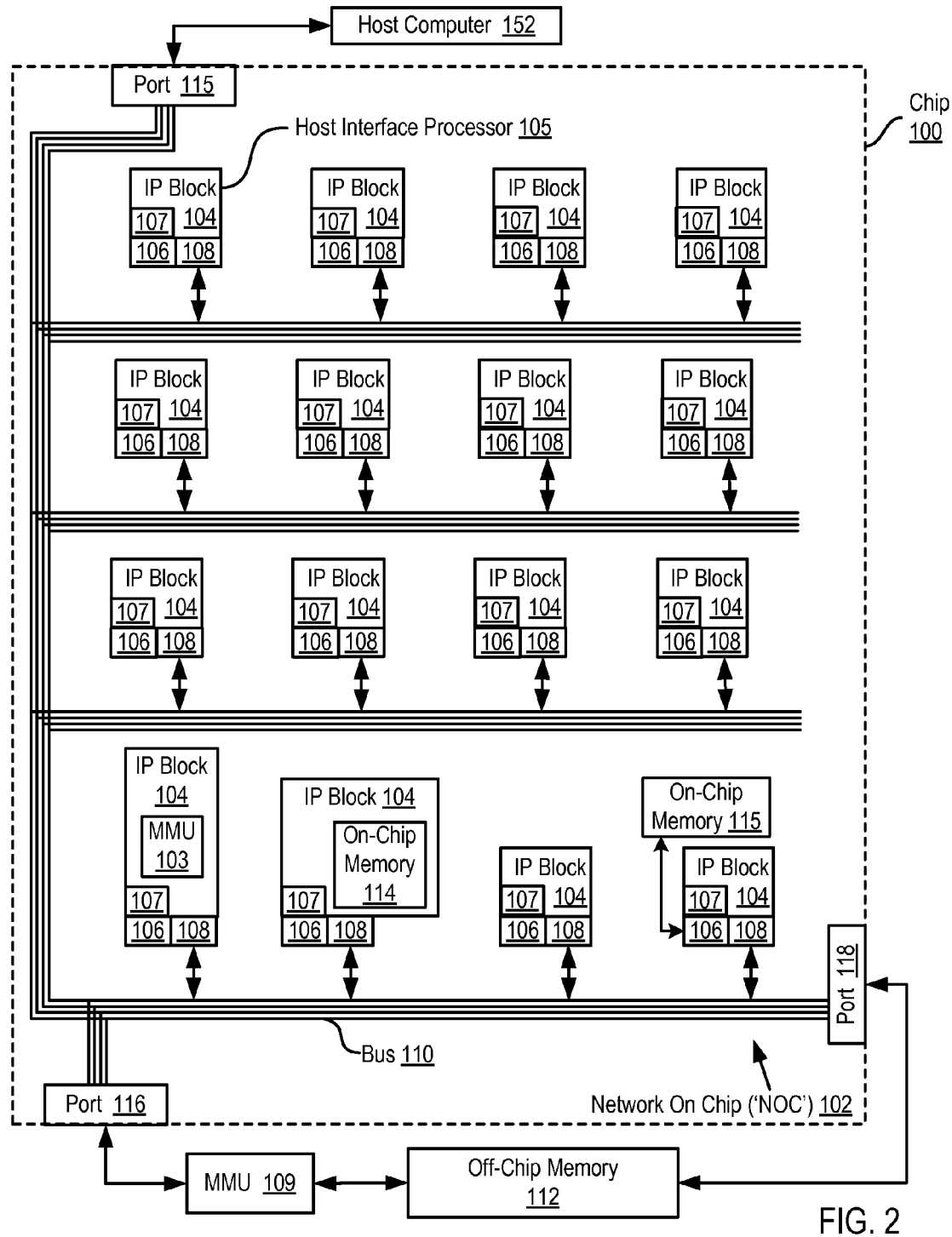
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), a data communications bus (110), memory communications controllers (106), and bus interface controllers (108). Each IP block (104) is adapted to the data communications bus (110) through a memory communications controller (106) and a bus interface controller (108). Each memory communications controller, in conjunction with one of the bus interface controllers, controls memory-addressed communications between an IP block and memory, and each memory communications controller, in conjunction with one of the bus interface controllers, controls memory addressed communications between one of the IP blocks and other IP blocks.

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs, for example.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

In the example of FIG. 2, each IP block (104) includes a low latency, high bandwidth application messaging interconnect (107) that adapts the IP block to the data communications bus (110) for purposes of data communications among IP blocks—as well as data communications between IP blocks and memory. As described in more detail below, each such messaging interconnect includes an inbox and an outbox.

Each IP block (104) in the example of FIG. 2 is adapted to the data communications bus (110) through a memory communications controller (106) that operates in conjunction with one of the bus interface controllers (108) to adapt the IP block to the bus. Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each bus interface controller (108) controls memory addressed communications between IP blocks (104) and between IP blocks and memory. Examples of memory addressed communications between IP blocks include messages carrying data and instructions for processing the data among IP blocks in parallel applications and in pipelined applications. Examples of memory addressed communications between an IP block and memory include memory load and memory store instructions. The bus interface controllers (108) are described in more detail below with reference to FIG. 3.

Each IP block (104) in the example of FIG. 2 is adapted to the data communications bus (110). The data communications bus (110) connected to the IP blocks through bus interface controllers and memory communications controllers implements the network operations of the NOC. The bus (110) supports packets structures implemented on physical, parallel bus wire connecting all the bus interface controllers. The wire bus wide is enough to accommodate simultaneously an entire data communications packet, including all header information and payload data. If a packet structure includes 64 bytes, for example, including an eight byte header and 56 bytes of payload data, then the wire bus that implements the physical bus structure is 64 bytes wide, 512 wires. In addition, bus may be implemented so that its function is entirely bi-directional, so that if the bus packet structure includes 64 bytes, the wire bus actually contains 1024 wires. A message can include more than one packet, but, in the example of FIG. 2, each packet fits precisely onto the width of the wire bus. Such a precise fit, however, is not a limitation of the present invention. NOCs according to embodiments of the present invention can include packet structures both larger than and smaller than the width of the bus.

Each memory communications controller (106) in the example of FIG. 2 controls, in conjunction with one of the bus interface controllers (108) memory addressed communications between an IP block and memory—as well as memory addressed communications between one of the IP blocks and other IP blocks. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communications controller (106) can be addressed by the IP block that is adapted to the network by that memory communication controller—and can also be addressed from any other IP block anywhere in the NOC.

The example NOC (102) includes two memory management units ('MMUs') (103, 109), illustrating two alternative memory architectures for NOCs according to embodiments of the present invention. MMU (103) is implemented within an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (103, 109), data communications port (118) illustrates a third memory architecture useful in NOCs according to embodiments of the present invention. Port (118) provides a direct connection between IP blocks (104) of the NOC (102) through the bus (110) to off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directly through the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer (152). A NOC may, for example, implement a video graphics adapter (209) or a coprocessor (157) on a larger computer (152) as described above with reference to FIG. 1. In the example of FIG. 2, the host interface processor (105) is connected to the larger host computer (152) through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the bus structure (110) of the NOC coprocessor (157) and the protocol required for the front side bus (163) between the NOC coprocessor (157) and the bus adapter (158).

Figure 3:
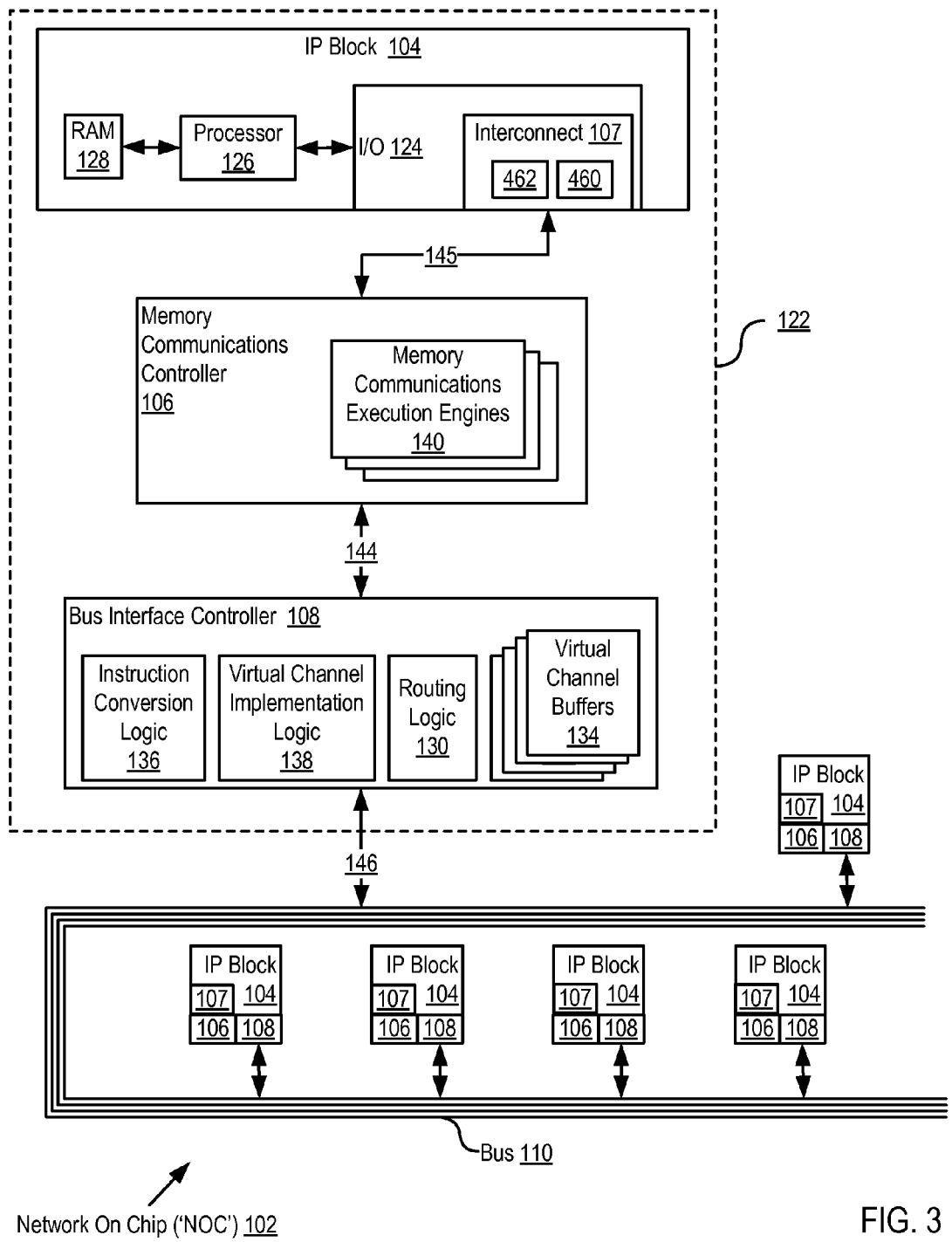
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), a data communications bus (110), memory communications controllers (106), and bus interface controllers (108). Each IP block (104) is adapted to the data communications bus (110) through a memory communications controller (106) and a bus interface controller (108). Each memory communications controller (106), in conjunction with a bus interface controller (108), controls both memory addressed communications between an IP block and memory and also controls memory addressed communications between one of the IP blocks and other IP blocks through the data communications bus (110). In the example of FIG. 3, one set (122) of an IP block (104) adapted to the data communications bus (110) through a memory communications controller (106) and a bus interface controller (108) is expanded to aid a more detailed explanation of their structure and operations. All the IP blocks, memory communications controllers, and the bus interface controllers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks in this example as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the example of FIG. 3, each IP block includes a low latency, high bandwidth application messaging interconnect (107) that adapts the IP block to the data communications bus (110) for purposes of data communications among IP blocks as well as communications between IP blocks and memory. As described in more detail below, each such messaging interconnect includes an inbox (460) and an outbox (462).

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (144) between the data communications bus (110) and the IP block (104) through the bus interface controller (108). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the data communications bus (110) of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each bus interface controller (108) is enabled to convert memory addressed communications instructions from command format to bus packet format for transmission among the IP blocks (104) through the data communications bus (110). The memory addressed communications instructions are formulated in command format by the IP block (104) or by the memory communications controller (106) and provided to the bus interface controller (108) in command format. The command format is a native format that conforms to architectural register files of the IP block (104) and the memory communications controller (106). The bus packet format is the format required for transmission through the data communications bus (110). Each such message is composed of one or more bus packets. Examples of such memory addressed communications instructions that are converted from command format to packet format in the bus interface controller include memory load instructions and memory store instructions between IP blocks and memory. Such communications instructions may also include memory addressed communications instructions that send messages among IP blocks carrying data and instructions for processing the data among IP blocks in parallel applications and in pipelined applications. In this example, all such inter-IP block communications are memory addressed, with the IP blocks mapped to a separate memory address for each IP block.

In the NOC (102) of FIG. 3, each IP block (104) is enabled to send memory addressed communications to and from memory through the IP block's memory communications controller (106) and then also through the IP block's bus interface controller (108) to the data communications bus (110). Such memory addressed communication include not only inter-IP block communications, but also memory access instructions, such as memory load instructions or memory store instructions, that are executed by a memory communication execution engine (140) of a memory communications controller (106) of an IP block (104).

Memory addressed communications typically are executed with message traffic on the data communications bus (110), because memory to be accessed from an IP block may be located anywhere in the physical memory address space, on-chip or off-chip, directly attached to any memory communications controller in the NOC, or ultimately accessed through any IP block of the NOC—regardless of which IP block originated any particular memory addressed communication. Such message traffic for memory addressed communications is passed from a memory communications controller (106) to an associated bus interface controller (108) for conversion (136) from command format to packet format and transmission across the bus (110) in a message. Memory addressed messages are addressed with memory addresses. Each memory address is mapped by the bus interface controllers to a memory communications controller responsible for some range of physical memory addresses. The physical location of a memory communication controller (106) is naturally also the physical location of that memory communication controller's associated network interface controller (108) and IP block (104). The instruction conversion logic (136) within each bus interface controller (108) is capable of identifying memory addresses administered by its associated memory communications controller (106) for purposes of receiving and transmitting memory addressed communications through the data communications bus (110) of the NOC (102).

Upon receiving message traffic from routers (110) of the network, each network interface controller (108) inspects each packet for memory addressed instructions addressed to the memory communications controller associated with the particular bus interface controller. Each packet containing a memory addressed instruction directed to the memory communications controller of the particular bus interface controller is handed to the memory communications controller (106) associated with the receiving bus interface controller, which executes the memory addressed instruction before sending any remaining payload of the packet to the associated IP block for further processing. In this way, memory contents are always prepared to support data processing by an IP block before the IP block begins execution of instructions from a message that depends upon particular memory content.

In the NOC (102) of FIG. 3, all messaging among IP blocks are memory addressed, including messages directed by a memory address, not to memory as such, but from one IP block to another IP block. Such messages transmit working data in pipelined applications, multiple data for single program processing among IP blocks in a SIMD application, and so on, as will occur to those of skill in the art. Such messages may be distinguished from memory access messages, for example, by type codes identifying each such message as an inter-IP block communications rather than a memory access instruction. Originating IP blocks for such messages may be configured, for examples, with memory addresses for other IP blocks of the NOC. Such inter-IP block communications are passed by the originating IP block through its I/O functions (124) to the IP block's memory communications controller to its but interface controller in command format, then converted to packet format by the network interface controller and transmitted through the data communications bus of the NOC to another IP block. Such memory addressed inter-IP block communications are bi-directional (144, 146), potentially proceeding to and from each IP block of the NOC, depending on their use in any particular application. Each bus interface controller (108) is enabled to both send and receive such communications to and from the data communications bus (110), and each bus interface controller is enabled to both send and receive such communications to and from an associated IP block (104) through an associated memory communications controller (106).

Each bus interface controller (108) in the example of FIG. 3 is also enabled to implement virtual channels on the data communications bus (110), characterizing bus data packets by type. Each bus interface controller (108) includes virtual channel implementation logic (138) that classifies by type each communication instruction from an associated memory communications controller (106) and records the type of instruction in a field of the bus data packet format before placing the packet on the data communications bus (110) for transmission on the NOC. Examples of communication instruction types include inter-IP block memory addressed messages, request messages from IP block that request data processing services from other IP blocks, responses to request messages, invalidate messages directed to caches; memory load and store messages directed from one IP block to memory located remotely from IP block—either elsewhere on the NOC or even off the NOC entirely; responses to memory load messages, and so on.

In addition to virtual channel implementation logic (138), each bus interface controller (108) in the example of FIG. 3 includes routing logic (130) and virtual channel buffers (134).

The routing logic (130) in this example is implemented as a network of synchronous and asynchronous logic that examines data packets from the data communications bus to determine whether any particular packet is addressed to the bus interface controller containing the examining routing logic. Each instance of routing logic in a bus interface controller is associated through the routing logic's bus interface controller with an IP block and/or with a segment of computer memory served by an associated IP block (114, 115 on FIG. 2). Outgoing packets sent from an associated IP block across the data communications bus to another IP block or computer memory are addressed by the sending IP block, so that there is no need for the routing logic to be concerned with outgoing packets. The routing logic, however, is configured with the memory addresses of its associated IP block and with the memory addresses of any computer memory served by its associated IP block. The routing logic of each bus interface controller examines every data packet transmitted over the data communications bus, ignoring packets not addressed to the routing logic's associated IP block or to memory served by the routing logic's associated IP block and retaining for further processing data packets that are addressed to the routing logic's associated IP block or to memory served by the routing logic's associated IP block.

In the NOC (102) of FIG. 3, each bus interface controller (108) implements two or more virtual communications channels, where each virtual communications channel is characterized by a communication type. Communication instruction types, and therefore virtual channel types, may include, for example, those mentioned above: inter-IP block memory addressed messages, request messages, responses to request messages, invalidate messages directed to caches; memory load and store messages; responses to memory load messages, and so on. In support of virtual channels, each bus interface controller (108) in the example of FIG. 3, in addition to virtual channel implementation logic (136), also includes virtual channel buffers (134). The virtual channel implementation logic (136) examines each outgoing data packet for its assigned communications type and places each packet in an outgoing virtual channel buffer (134) for that communications type for transmission on the data communications bus (110) of the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise other bus interface controllers through the virtual channel control logic (138) to suspend transmission in a virtual channel, that is, suspend transmission of packets of a particular communications type. When one virtual channel is so suspended, all other virtual channels are unaffected—and can continue to operate at full capacity. The control signals are wired through the bus itself to all of the bus interface controllers (108). Each bus interface controller is configured to, upon receipt of such a signal, refuse to accept, from its associated memory communications controller (106) and therefore from its associated IP block (104), communications instructions for the suspended virtual channel. In this way, suspension of a virtual channel affects all the hardware that implements the virtual channel, all the way back up through bus interface controllers and memory communications controllers to the originating IP blocks.

One effect of suspending packet transmissions in a virtual channel is that no packets are ever dropped in the architecture of FIG. 3. When a bus interface controller encounters a situation in which a packet might be dropped in some unreliable data communications protocol such as, for example, the Internet Protocol, the bus interface controllers in the example of FIG. 3 suspend by their virtual channel buffers (134) and their virtual channel implementation logic (136) all transmissions of packets in a virtual channel until buffer space is again available, eliminating any need to drop packets. The NOC of FIG. 3, therefore, implements highly reliable data communications protocols with an extremely thin layer of hardware.

Figure 4:
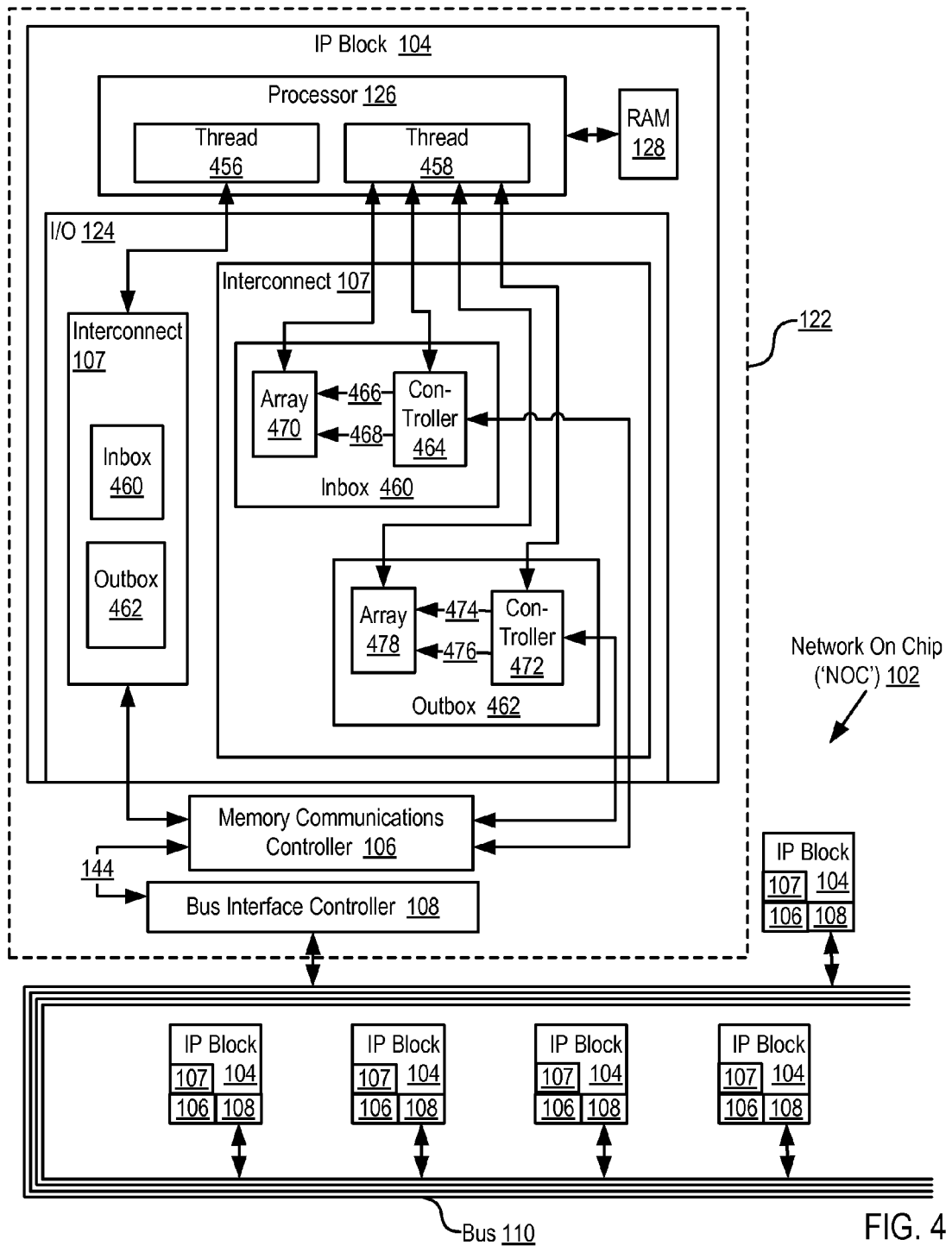
FIG. 4 sets forth a functional block diagram of a further example NOC according to embodiments of the present invention.

For further explanation, FIG. 4 sets forth a functional block diagram of a further example NOC according to embodiments of the present invention. The example NOC of FIG. 4 is similar to the example NOC of FIG. 2 in that the example NOC of FIG. 4 is implemented on a chip (100 on FIG. 2), and the NOC (102) of FIG. 4 includes integrated processor ('IP') blocks (104), a data communications bus (110), memory communications controllers (106), and bus interface controllers (108). Each IP block (104) is adapted to a data communications bus (110) through a memory communications controller (106) and a bus interface controller (108). Each memory communications controller (106), in conjunction with a bus interface controller (108), controls both memory addressed communications between an IP block and memory and also controls memory addressed communications between one of the IP blocks and other IP blocks through the data communications bus (110).

In the example of FIG. 4, each IP block includes a low latency, high bandwidth application messaging interconnect (107) that adapts the IP block to the data communications bus (110) for purposes of data communications among IP blocks. The low latency, high bandwidth application messaging interconnect (107) is an interconnect in the sense that it is composed of sequential and non-sequential logic that connects an IP block (104) through a memory communications controller (106) and a bus interface controller (108) to the data communications bus (110) for purposes of data communications among IP blocks and between IP blocks and memory. The low latency, high bandwidth application messaging interconnect (107) is a low latency, high bandwidth interconnect in that it provides a very fast interconnection between the IP block and the network interface controller—so fast because from the point of view of the IP block, for outgoing messages, the process of sending a message to the network interface controller represents a single immediate write to high speed local memory in the outbox array (478), and receiving a message in the IP block (104) from the network interface controller (108) represents a single read operation from a high speed local memory in the inbox array (470). As described in more detail below, each the messaging interconnect (107) includes an inbox (460) and an outbox (462). In the example of FIG. 4, one set (122) of an IP block (104) adapted to the data communications bus (110) through a memory communications controller (106) and a bus interface controller (108) is expanded to aid a more detailed explanation of the structure and operations of the messaging interconnect (107). All the IP blocks, memory communications controllers, bus interface controllers, and the data communications bus (110) in the example of FIG. 4 are configured in the same manner as the expanded set (122).

In the example NOC of FIG. 4, each outbox (462) includes an array (478) of memory indexed by an outbox write pointer (474) and an outbox read pointer (476). Each outbox (462) also includes an outbox message controller (472). In the example NOC of FIG. 4, the outbox has an associated thread of execution (458) that is a module of computer program instructions executing on a processor (126) of the IP block (104). Each such associated thread of execution (458) is enabled to write message data into the array (478) and to provide to the outbox message controller (472) message control information, including message destination identification and an indication that message data in the array (478) is ready to be sent. The message control information, such as destination address or message identification, and other control information such as 'ready to send,' may be written to registers in the outbox message controller (472) or such information may be written into the array (478) itself as part of the message data, in a message header, message meta-data, or the like.

The outbox message controller (472) is implemented as a network of sequential and non-sequential logic that is enabled to set the outbox write pointer (474). The outbox write pointer (474) may be implemented, for example, as a register in the outbox message controller (472) that stores the memory address of the location in the array where an associated thread of execution (458) is authorized to write message data. The outbox message controller (472) is also enabled to set the outbox read pointer (476). The outbox read pointer (476) may be implemented, for example, as a register in the outbox message controller (472) that stores the memory address of the location in the array where the outbox message controller is to read its next message data for transmission from the outbox through the memory communications controller (106) and the bus interface controller (108) onto the data communications bus (110).

The outbox message controller (472) is also enabled to send to the data communications bus message data written into the array (478) by the thread of execution (458) associated with the outbox (462). In the NOC (102) of FIG. 4, each bus interface controller (108) is enabled to convert communications instructions from command format to but packet format for transmission among the IP blocks (104) through the data communications bus (110). The communications instructions are formulated in command format by the associated thread of execution (458) in the IP block (104) and provided by the outbox message controller (472) to the bus interface controller (108) in command format. The command format is a native format that conforms to architectural register files of the IP block (104) and the outbox message controller (472). The bus packet format is the format required for transmission on the data communications bus (110). Each such message is composed of one or more bus packets. Such communications instructions may include, for example, communications instructions that send messages among IP blocks carrying data and instructions for processing the data among IP blocks in parallel applications and in pipelined applications.

In the example NOC of FIG. 4, each inbox (460) includes an array (470) of memory indexed by an inbox write pointer (466) and an inbox read pointer (468). Each inbox (460) also includes an inbox message controller (464). The inbox message controller (464) is implemented as a network of sequential and non-sequential logic that is enabled to set the inbox write pointer (466). The inbox write pointer (466) may be implemented, for example, as a register in the inbox message controller (464) that stores the memory address of the beginning location in the array (470) where message data from an outbox of another IP block is to be written. The inbox message controller (464) is also enabled to set the inbox read pointer (468). The inbox read pointer (468) may be implemented, for example, as a register in the inbox message controller (464) that stores the memory address of the beginning location in the array (470) where an associated thread of execution (456) may read the next message received from an outbox of some other IP block.

In the example NOC of FIG. 4, the inbox has an associated thread of execution (458) that is a module of computer program instructions executing on a processor of the IP block. Each such associated thread of execution (458) is enabled to read from the array message data sent from some other outbox of another IP block. The thread of execution may be notified that message data sent from another outbox of another IP block has been written into the array by the message controller through a flag set in a status register, for example.

The inbox message controller (464) is also enabled to receive from the data communications bus (110) message data written to the data communications bus from an outbox of another IP block and provide to a thread of execution (458) associated with the inbox (460) the message data received from the bus. The inbox message controller of FIG. 4 receives from a network interface controller (108) message data from an outbox of some other IP block and writes the received message data to the array (470). Upon writing the received message data to the array, the inbox message controller (464) is also enabled to notify the thread of execution (458) associated with the inbox that message data has been received from the network by, for example, setting a data-ready flag in a status register for the inbox message controller (464). The associated thread of execution may, for example, 'sleep until flag' before a message load, or a load opcode can be configured to check a data-ready flag in the inbox message controller.

In the example of FIG. 4, the inbox message controller (464) is also enabled to send a response across the data communications bus (110) to the sender for each message received. The sender may be viewed as the sending application on another IP block or the sending outbox, for example. Such a response may represent, for example, an indication that delivery of a message failed, an indication that the message was received in good order, or an indication that the message was not addressed to the inbox. Delivery of a message may fail typically, for example, because the corresponding inbox is full, the storage array in the inbox is full, or a corresponding virtual channel buffer is full. The sending outbox, upon receiving an indication of a failure to deliver a message, can be enabled to retry until the message succeeds in delivery. Alternatively, for example, the sending outbox can be configured to return to the sending application an indication that the delivery failed, and the sending application can then decide for itself whether to drop the attempt to send or retry the transmission.

The example of FIG. 4 is illustrated with two threads of execution associated with two I/O interconnections (107), each I/O interconnection having an inbox (460) and an outbox (462), thereby providing each thread of execution with its own inbox and outbox. Each thread of execution in this example is a hardware thread, such as can implemented by multiple execution units in a superscalar processor or in separate execution cores in a multicore processor. This particular architecture, two hardware threads with dedicated inboxes and outboxes is not, however, a limitation of the present invention. Other NOC architectures according to embodiments of the present invention, as will occur to those of skill in the art, may include any number of threads of execution, either hardware or software threads, as well as any number or arrangement of inboxes and outboxes.

Figure 5:
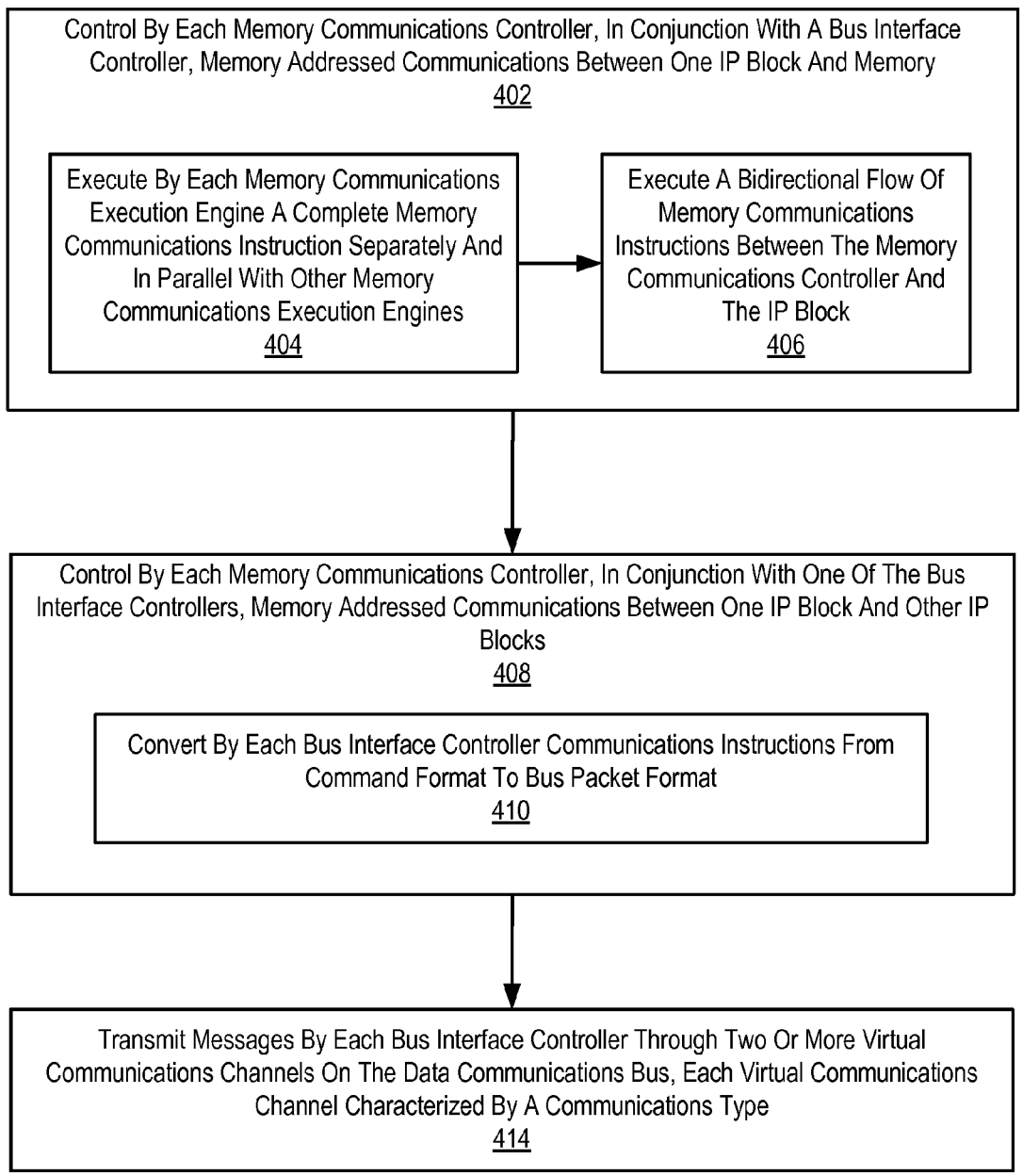
FIG. 5 sets forth a flow chart illustrating an exemplary method for data processing with a NOC according to embodiments of the present invention.

For further explanation, FIG. 5 sets forth a flow chart illustrating an exemplary method for data processing with a NOC according to embodiments of the present invention. The method of FIG. 5 is implemented on a NOC similar to the ones described above in this specification, a NOC (102 on FIG. 3) that is implemented on a chip (100 on FIG. 3) with IP blocks (104 on FIG. 3), a data communications bus (110 on FIG. 3), memory communications controllers (106 on FIG. 3), and bus interface controllers (108 on FIG. 3). Each IP block (104 on FIG. 3) is adapted to the data communications bus (110 on FIG. 3) through a memory communications controller (106 on FIG. 3) and a bus interface controller (108 on FIG. 3). In the method of FIG. 5, each IP block (104 on FIG. 3) is also adapted to the data communications bus (110 on FIG. 3) by a low latency, high bandwidth application messaging interconnect (107 on FIG. 3) that includes an inbox (460 on FIG. 3) and an outbox (462 on FIG. 3). In the method of FIG. 5, each IP block may be implemented as a reusable unit of synchronous or asynchronous logic design used as a building block for data processing within the NOC.

The method of FIG. 5 includes controlling (402) by each memory communications controller (106 on FIG. 3), in conjunction with one of the bus interface controllers (108), memory addressed communications between an IP block and memory. In the method of FIG. 5, the memory communications controller includes a plurality of memory communications execution engines (140 on FIG. 3). Also in the method of FIG. 5, controlling (402) communications between an IP block and memory is carried out by executing (404) by each memory communications execution engine a complete memory communications instruction separately and in parallel with other memory communications execution engines and executing (406) a bidirectional flow of memory communications instructions between the memory communications controller and the IP block. In the method of FIG. 5, memory communications instructions may include translation lookaside buffer control instructions, cache control instructions, barrier instructions, memory load instructions, and memory store instructions. In the method of FIG. 5, memory may include off-chip main RAM, memory connected directly to an IP block through a memory communications controller, on-chip memory enabled as an IP block, and on-chip caches.

The method of FIG. 5 also includes controlling (408) by each memory communications controller (106 on FIG. 3), in conjunction with one of the bus interface controllers (108 on FIG. 3), memory addressed communications between one of the IP blocks and other IP blocks, so-called inter-IP block communications, across the data communications bus. In the method of FIG. 5, controlling (408) memory addressed communications between one of the IP blocks and other IP blocks includes converting (410) converting by each bus interface controller communications instructions from command format to bus packet format.

The method of FIG. 5 also includes transmitting (414) messages by each bus interface controller through two or more virtual communications channels on the data communications bus. Each virtual communications channel is characterized by a communications type, typically implemented with a type code on each data communications message or each data communications packet intended for transmission on the data communications bus. Communication instruction types, and therefore virtual channel types, include, for example: inter-IP block network-address-based messages, request messages, responses to request messages, invalidate messages directed to caches; memory load and store messages; and responses to memory load messages, and so on, for any communications type as may occur to those of skill in the art. In support of virtual channels, each bus interface controller (108 on FIG. 3) also includes virtual channel implementation logic (138 on FIG. 3) and virtual channel buffers (134 on FIG. 3). The virtual channel implementation logic examines each outgoing data packet for its assigned communications type and places each packet in an outgoing virtual channel buffer (134) for that communications type for transmission on the data communications bus (110) of the NOC.

Figure 6:
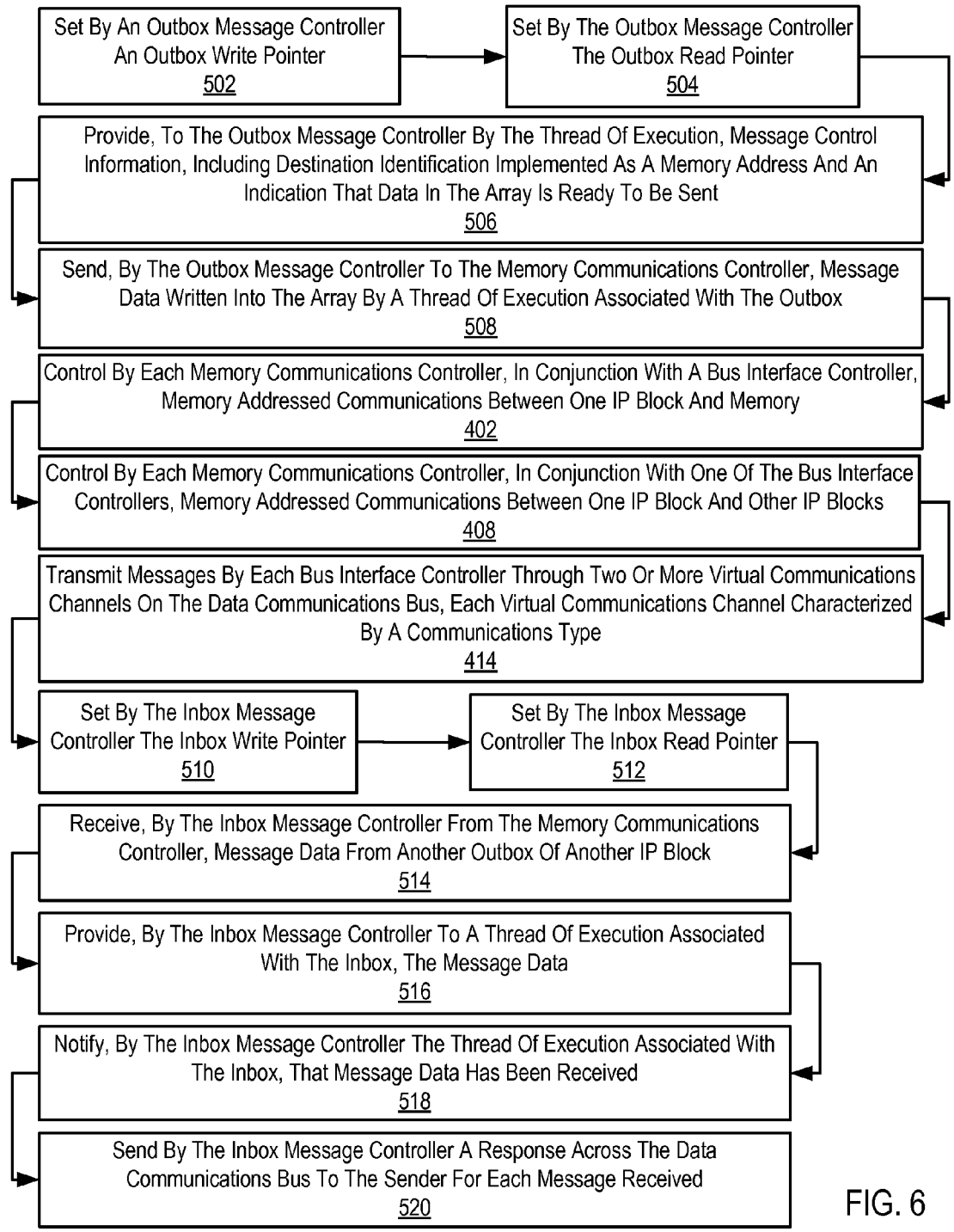
FIG. 6 sets forth a flow chart illustrating a further exemplary method for data processing with a NOC according to embodiments of the present invention.

For further explanation, FIG. 6 sets forth a flow chart illustrating a further exemplary method for data processing with a NOC according to embodiments of the present invention. The method of FIG. 6 is similar to the method of FIG. 5 in that the method of FIG. 6 is implemented on a NOC similar to the ones described above in this specification, a NOC (102 on FIG. 3) that is implemented on a chip (100 on FIG. 3) with IP blocks (104 on FIG. 3), a data communications bus (110 on FIG. 3), memory communications controllers (106 on FIG. 3), and bus interface controllers (108 on FIG. 3). Each IP block (104 on FIG. 3) is adapted to a router (110 on FIG. 3) through a memory communications controller (106 on FIG. 3) and a bus interface controller (108 on FIG. 3).

In the method of FIG. 6, each IP block (104 on FIG. 3) may be implemented as a reusable unit of synchronous or asynchronous logic design used as a building block for data processing within the NOC, and each IP block is also adapted to the network by a low latency, high bandwidth application messaging interconnect (107 on FIG. 4) comprising an inbox (460 on FIG. 4) and an outbox (462 on FIG. 4). In the method of FIG. 6, each outbox (462 on FIG. 4) includes an outbox message controller (472 on FIG. 4) and an array (478 on FIG. 4) for storing message data, with the array indexed by an outbox write pointer (474 on FIG. 4) and an outbox read pointer (476 on FIG. 4). In the method of FIG. 6, each inbox (460 on FIG. 4) includes an inbox message controller (464 on FIG. 4) and an array (470 on FIG. 4) for storing message data, with the array (470 on FIG. 4) indexed by an inbox write pointer (466 on FIG. 4) and an inbox read pointer (468 on FIG. 4).

The method of FIG. 6, like the method of FIG. 5, includes the following steps which operate in a similar manner as described above with regard to the method of FIG. 5: controlling (402) by each memory communications controller, in conjunction with a bus interface controller, memory addressed communications between an IP block and memory; controlling (408) by each memory communications controller, in conjunction with a bus interface controller, memory addressed communications between one IP block and other IP blocks; and transmitting (414) messages by each bus interface controller (108 on FIG. 3) through two or more virtual communications channels, where each virtual communications channel is characterized by a communications type.

In addition, however, the method of FIG. 6 also includes setting (502) by the outbox message controller the outbox write pointer. The outbox write pointer (474 on FIG. 4) may be implemented, for example, as a register in the outbox message controller (472 on FIG. 4) that stores the memory address of the location in the array where the associated thread of execution is authorized to write message data. The method of FIG. 6 also includes setting (504) by the outbox message controller the outbox read pointer. The outbox read pointer (476 on FIG. 4) may be implemented, for example, as a register in the outbox message controller (472 on FIG. 4) that stores the memory address of the location in the array where the outbox message controller is to read its next message data for transmission over the network from the outbox.

The method of FIG. 6 also includes providing (506), to the outbox message controller by the thread of execution, message control information, including destination identification implemented as a memory address and an indication that data in the array is ready to be sent. The message control information, such as destination address or message identification, and other control information such as 'ready to send,' may be written to registers in the outbox message controller (472 on FIG. 4) or such information may be written into the array (478 on FIG. 4) itself as part of the message data, in a message header, message meta-data, or the like.

The method of FIG. 6 also includes sending (508), by the outbox message controller to the memory communications controller, message data written into the array by a thread of execution associated with the outbox. In the NOC upon which the method of FIG. 6 is implemented, each bus interface controller (108 on FIG. 4) is enabled to convert communications instructions from command format to bus packet format for transmission among the IP blocks (104 on FIG. 4) through the data communications bus (110 on FIG. 4). The communications instructions are formulated in command format by the associated thread of execution (458 on FIG. 4) in the IP block (104 on FIG. 4) and provided by the outbox message controller (472 on FIG. 4) through the memory communications controller (106 on FIG. 4) to the bus interface controller (108 on FIG. 4) in command format. The command format is a native format that conforms to architectural register files of the IP block (104 on FIG. 4) and the outbox message controller (472 on FIG. 4). The bus packet format is the format required for transmission through the data communications bus (110 on FIG. 4) of the NOC. Each such message is composed of one or more bus data packets. Such communications instructions may include, for example, communications instructions that send messages among IP blocks carrying data and instructions for processing the data among IP blocks in parallel applications, in pipelined applications, or the like.

The method of FIG. 6 also includes setting (510) by the inbox message controller the inbox write pointer. The inbox write pointer (466 on FIG. 4) may be implemented, for example, as a register in the inbox message controller (464 on FIG. 4) that stores the memory address of the beginning location in the array (470 on FIG. 4) where message data from an outbox of another IP block is to be written. The method of FIG. 6 also includes setting (512) by the inbox message controller the inbox read pointer. The inbox read pointer (468 on FIG. 4) may be implemented, for example, as a register in the inbox message controller (464 on FIG. 4) that stores the memory address of the beginning location in the array (470 on FIG. 4) where an associated thread of execution (456 on FIG. 4) may read the next message received from an outbox of some other IP block.

The method of FIG. 6 also includes receiving (514), by the inbox message controller from the memory communications controller, message data from another outbox of another IP block, and providing (516), by the inbox message controller to a thread of execution associated with the inbox, the message data. The inbox message controller (454 on FIG. 4) is enabled to receive from the data communications bus, through the bus interface controller and the memory communications controller, message data written to the data communications bus from an outbox of another IP block and provide to a thread of execution (456 on FIG. 4) associated with the inbox (460 on FIG. 4) the received message data. The inbox message controller of FIG. 4 receives the message data from an outbox of some other IP block and writes the received message data to the array (470 on FIG. 4), thereby making the message data available to the associated thread of execution.

The method of FIG. 6 also includes notifying (518), by the inbox message controller the thread of execution associated with the inbox, that message data has been received. Upon writing the received message data to the array, an inbox message controller (464 on FIG. 4) is also enabled to notify the thread of execution (456 on FIG. 4) associated with the inbox that message data has been received by, for example, setting a data-ready flag in a status register of the inbox message controller (454 on FIG. 4). The associated thread of execution may, for example, 'sleep until flag' before a message load, or a load opcode can be configured to check a data-ready flag in the inbox message controller.

The method of FIG. 6 also includes sending (520) by the inbox message controller a response across the data communications bus to the sender for each message received. Such a response may represent, for example, an indication that delivery of a message failed, an indication that the message was received in good order, or an indication that the message was not addressed to the inbox. Delivery of a message may fail typically, for example, because the corresponding inbox is full, the storage array in the inbox is full, or a corresponding virtual channel buffer is full. The sending outbox, upon receiving an indication of a failure to deliver a message, can be enabled to retry until the message succeeds in delivery. Alternatively, for example, the sending outbox can be configured to return to the sending application an indication that the delivery failed, and the sending application can then decide for itself whether to drop the attempt to send or retry the transmission.

Readers will recognize in view of the explanations set forth above that the benefits of data processing on a NOC according to embodiments of the present invention include the fact that by providing each IP block with its own inbox and outbox, including memory arrays (470, 478 on FIG. 4) for message delivery dedicated to each IP block, by comparison with traditional simultaneous multiprocessing ('SMP') architectures, an entire round trip to main RAM is avoided for each and every message transmitted across the data communications bus between IP blocks of the NOC—representing a substantial reduction of the overall memory I/O burden on the NOC.

Exemplary embodiments of the present invention are described largely in the context of a fully functional computer system for data processing on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A network on chip ('NOC') comprising:
   integrated processor ('IP') blocks, a single data communications bus, memory communications controllers, and bus interface controllers;
   each IP block adapted to the single data communications bus through a memory communications controller and a bus interface controller;
   each memory communications controller, in conjunction with one of the bus interface controllers, controlling memory addressed communications between an IP block and memory;
   each memory communications controller, in conjunction with one of the bus interface controllers, controlling memory addressed communications between one of the IP blocks and other IP blocks;
   each IP block adapted to the single data communications bus by a low latency, high bandwidth application messaging interconnect comprising an inbox and an outbox;
   wherein the single data communications bus forms a network coupling IP blocks for data communications among one another and the NOC further comprises no other network coupling IP blocks for data communications among one another;
   wherein all communications messaging among IP blocks are memory addressed including messaging from one IP block to another IP block;
   wherein each outbox comprises an array indexed by an outbox write pointer and an outbox read pointer, the outbox further comprising an outbox message controller enabled to set the outbox write pointer, set the outbox read pointer, and send to the memory communications controller message data written into the array by a thread of execution associated with the outbox; and
   wherein each inbox comprises an array indexed by an inbox write pointer and an inbox read pointer, the inbox further comprising an inbox message controller enabled to set the inbox write pointer, set the inbox read pointer, receive from the memory communications controller message data from another outbox of another IP block, and provide to a thread of execution associated with the inbox the message data.

2. The NOC of claim 1 wherein the thread of execution is enabled to provide to the memory communications controller message control information, including destination identification implemented as a memory address and an indication that data in the array is ready to be sent.

3. The NOC of claim 1 wherein the inbox message controller is enabled to notify the thread of execution associated with the inbox that message data has been received.

4. The NOC of claim 1 wherein the inbox message controller is enabled to send a response across the data communications bus to the sender for each message received.

5. The NOC of claim 1 wherein the memory communications controller comprises:
   a plurality of memory communications execution engines, each memory communications execution engine enabled to execute a complete memory communications instruction separately and in parallel with other memory communications execution engines; and bidirectional memory communications instruction flow between the network and the IP block.

6. The NOC of claim 1 wherein each IP block comprises a reusable unit of synchronous or asynchronous logic design used as a building block for data processing within the NOC.

7. The NOC of claim 1 wherein each bus interface controller comprises logic circuitry that implements two or more virtual communications channels on the data communications bus, each virtual communications channel characterized by a communications type.

8. The NOC of claim 1 wherein each bus interface controller is enabled to convert communications instructions from command format to bus packet format.

9. A method of data processing with a network on chip ('NOC'), the NOC comprising:
   integrated processor ('IP') blocks, a single data communications bus, memory communications controllers, and bus interface controllers,
   each IP block adapted to the single data communications bus through a memory communications controller and a bus interface controller, and
   each IP block adapted to the single data communications bus by a low latency, high bandwidth application messaging interconnect comprising an inbox and an outbox,
   wherein the single data communications bus forms a network coupling IP blocks for data communications among one another and the NOC further comprises no other network coupling IP blocks for data communications among one another,
   wherein all communications messaging among IP blocks are memory addressed including messaging from one IP block to another IP block;
   the method comprising:
   controlling by each memory communications controller, in conjunction with one of the bus interface controllers, memory addressed communications between one of the IP blocks and memory; and
   controlling by each memory communications controller, in conjunction with one of the bus interface controllers, memory addressed communications between one of the IP blocks and other IP blocks;
   wherein each outbox comprises an array indexed by an outbox write pointer and an outbox read pointer, the outbox further comprises an outbox message controller, and the method further comprises:
   setting by the outbox message controller the outbox write pointer;
   setting by the outbox message controller the outbox read pointer; and
   sending, by the outbox message controller to the memory communications controller, message data written into the array by a thread of execution associated with the outbox; and
   wherein each inbox comprises an array indexed by an inbox write pointer and an inbox read pointer, the inbox further comprising an inbox message controller, the method further comprising:
   setting by the inbox message controller the inbox write pointer;
   setting by the inbox message controller the inbox read pointer;
   receiving, by the inbox message controller from the memory communications controller, message data from another outbox of another IP block; and
   providing, by the inbox message controller to a thread of execution associated with the inbox, the message data.

10. The method of claim 9 further comprising providing, to the memory communications controller by the thread of execution, message control information, including destination identification implemented as a memory address and an indication that data in the array is ready to be sent.

11. The method of claim 9 further comprising notifying, by the inbox message controller the thread of execution associated with the inbox, that message data has been received.

12. The method of claim 9 further comprising sending by the inbox message controller a response across the data communications bus to the sender for each message received.

13. The method of claim 9 wherein the memory communications controller comprises a plurality of memory communications execution engines and controlling communications between an IP block and memory further comprises:
   executing by each memory communications execution engine a complete memory communications instruction separately and in parallel with other memory communications execution engines; and
   executing a bidirectional flow of memory communications instructions between the memory communications controller and the IP block.

14. The method of claim 9 wherein each IP block comprises a reusable unit of synchronous or asynchronous logic design used as a building block for data processing within the NOC.

15. The method of claim 9 further comprising transmitting messages by each bus interface controller through two or more virtual communications channels on the data communications bus, each virtual communications channel characterized by a communications type.

16. The method of claim 9 wherein controlling communications between an IP block and other IP blocks further comprises converting by each bus interface controller communications instructions from command format to bus packet format.

* * * * *